United States Patent Office 3,511,989
Patented May 12, 1970

3,511,989
**DEVICE FOR X-RAY RADIOMETRIC DETERMINA-
TION OF ELEMENTS IN TEST SPECIMENS**
Solomon Lazarevich Yakubovich, Ul. Poletaeva 52, korp.
5, kv. 108; Vasily Nikolaevich Smirnov, Ul. Ryleeva,
23, kv. 29; Stanislav Mikhailovich Przhiyalgovsky,
Nagornayo ul. 35, korp. "G," kv. 18; Georgy Ivanovich
Brylyakov, Leninsky, prospekt 57, kv. 167; and Eduard
Sergeevich Blinov, Leninsky prospekt 60/2, korp. 8,
kv. 30, all of Moscow, U.S.S.R.
Filed Feb. 21, 1967, Ser. No. 617,665
Int. Cl. G01n 23/20
U.S. Cl. 250—51.5                                    5 Claims

ABSTRACT OF THE DISCLOSURE

A device for fluorescent X-ray quantitative analysis comprising a lead casing which accommodates a radioactive source for irradiating a changeable intermediate target and exciting therein characteristic radiation, the latter radiation being instrumental in exciting the characteristic radiation of the elements of a test specimen, which radiation is recorded by a detector. To account for the effect of variations in the elemental composition of a test specimen, a beta source is fixedly mounted in the casing or affixed to a movable shutter, the beta radiation from said source being scattered by said test specimen. Irradiation of the test specimen by radiation fluxes of two dissimilar types is attained due to a movable shutter which shields one source at a time, or by means of a test specimen holder having an even number of apertures and capable of providing for the simultaneous irradiation of two portions of a test specimen with two radiation fluxes of dissimilar type.

---

This invention relates to the application of radioactive isotopes and nuclear radiations for chemical analysis and, more particularly, it relates to devices for the quantitative determination of the concentration of elements of the Periodic System having atomic numbers $Z > 12$ in specimens of complex composition, e.g., during geological surveying, at ore-dressing, and in metallurgical, and chemical plants, etc.

There are known devices for the X-ray radiometric analysis of elements in test specimens in which the characteristic radiation of the sought element in a test specimen is excited by X-rays from a target irradiated with a radioactive source and coupled to the test specimen with a channel of variable cross-sectional area, the characteristic radiation being registered by means of a detector connected to the input of an amplifying recorder.

The prior art devices have a disadvantage in that the estimation of elements on the basis of characteristics radiation does not allow for differences in the elemental composition and, hence, in the absorption characteristics of a test and a reference specimen.

Because of differences in the absorption characteristics of specimens, there is no unequivocal dependence of the intensity of the characteristic radiation of the element being analyzed upon its content in a test specimen.

In analyses for iron, variations in the elemental composition of ores or ore-dressing products are associated with the substitution of CaO for rock-forming oxides $Al_2O_3$ and $SiO_2$.

It is an object of the present invention to provide a device for the X-ray radiometric determination of elements in test specimens which makes it possible to allow for the effect of variations in the elemental composition on the intensity of characteristic radiation of the sought element.

In accordance with this and other objects, the present device for the radioactivation determination of elements in test specimens comprises a beta emitter, the reflection of beta particles by the test specimen being indicative of absorption characteristics of the test specimen and providing the possibility of allowing for the effect of the elemental composition of the test specimen on the intensity of characteristic radiation of the sought element.

It is expedient to dispose the beta emitter so that the test specimen will be irradiated alternately by the radiation from the target and by the beta-particle flux.

The beta emitter may be made stationary by securing it in the body of the device, the alternate irradiation of the test specimen by the radiation from the target and by the beta-particle flux being attained by the provision of a movable shutter with a window, the beta emitter and target being disposed on one side of the shutter, while the test specimen is disposed on the other side of the shutter.

To attain the alternate irradiation of the test specimen by the radiation from the target and by the beta-particle flux, it is likewise feasible to dispose the movable shutter with a window between the target with the radioactive source and the test specimen, the beta-source being mounted on the shutter.

Advantageous results may also be obtained by using a stationary beta emitter mounted in the body of the device and by recording simultaneously in two channels the characteristic radiation and the beta radiation reflected by the test specimen. Two channel recording is made practicable by the provision of a rotating disk furnished with at least one pair of openings which accommodates two portions of the test specimen so that one portion is irradiated by the X-rays from the target, while the other portion is irradiated by the beta-particle flux.

Other objects and advantages of the present invention will become apparent from a consideration of the description of several embodiments taken in conjunction with the accompanying drawing, wherein.

Figure 1:
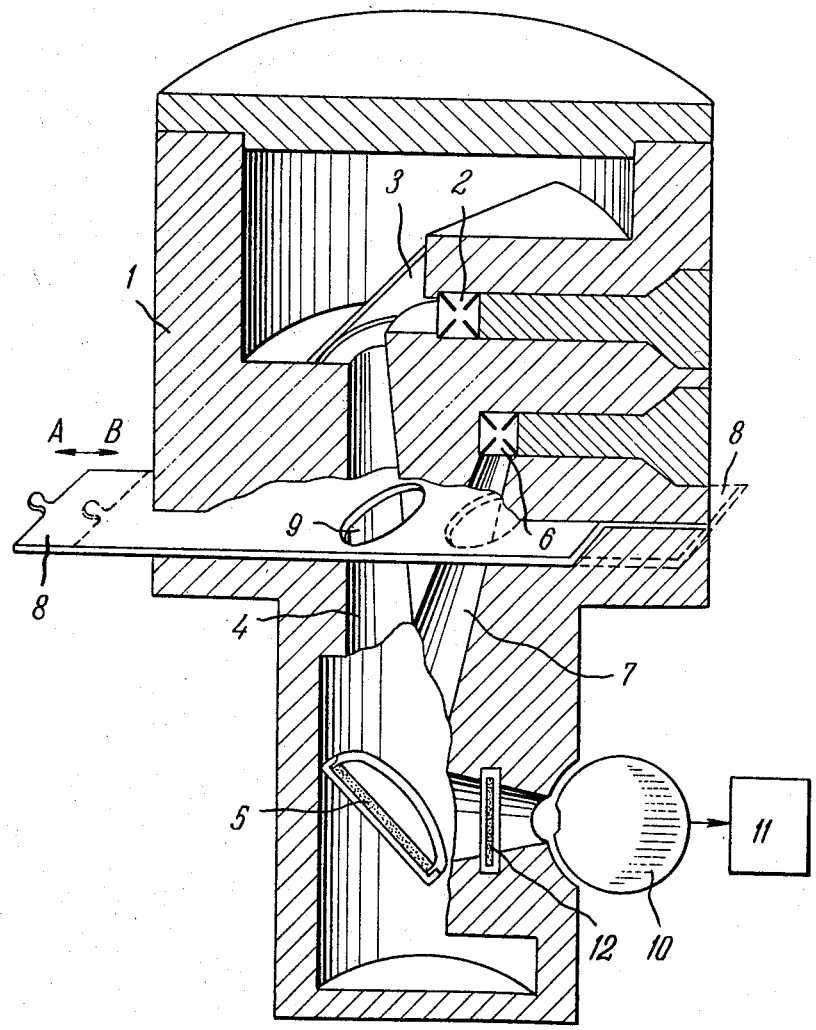
FIG. 1 is a sectional view of a first embodiment of the present invention.

The device according to the first embodiment comprises a measuring head and an amplifying recorder unit.

A lead body 1 (FIG. 1), which affords protection against penetrating radiation, accommodates a source 2, viz., a radioactive isotope with a target 3, the radiation from which target passes via a channel 4 onto a test specimen 5. Fixedly mounted in the top part of body 1 is a beta emitter 6, and the beta-particle flux irradiates, via a channel 7, test specimen 5. Channels 4 and 7 are intersected by a movable shutter 8 with a window 9, the shutter being disposed between target 3 with source 2, and emitter 6, on one side, and test specimen 5, on the other. A detector 10 coupled to the input of an amplifying recorder unit 11 provides for recording the characteristic radiation of the sought element excited in test specimen 5, as well as for recording the beta radiation reflected by this test specimen. Disposed in front of detector 10 is a holder 12, which accommodates Ross filters.

Figure 2:
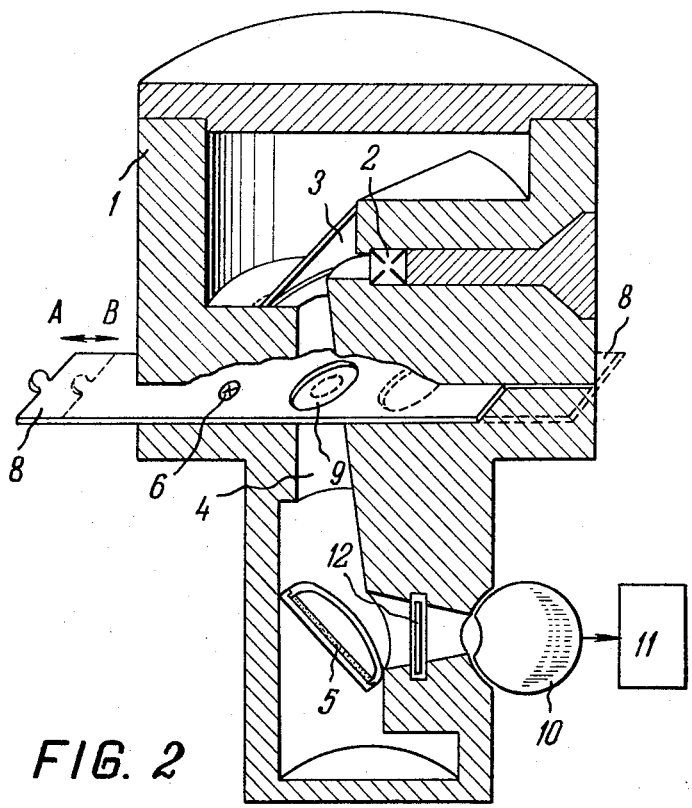
FIG. 2 shows a second embodiment of the same device.

In contradistinction to the first embodiment according to the present invention, in the second embodiment beta emitter 6 is disposed on movable shutter 8 with window 9, as shown in FIG. 2.

Figure 3:
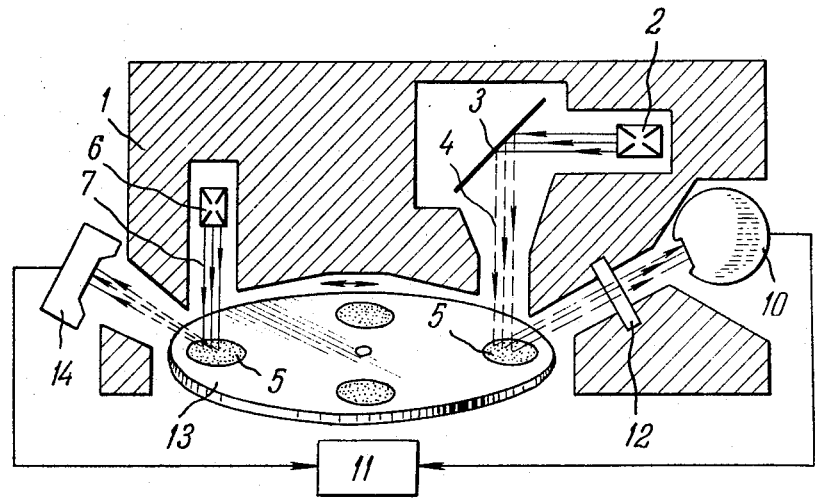
FIG. 3 shows a third embodiment of the same device.

In the device according to the third embodiment of the present invention, beta emitter 6 is fixedly mounted in body 1, and two portions of test specimen 5 are accommodated in openings of a rotating disk 13 (FIG. 3), said opening being brought in coincidence with the irradiation zone from beta emitter 6 and with that from target 3 with source 2, respectively. To register the beta particles reflected by test specimen 5, provision is made for a detector 14.

The device according to FIG. 1 operates as follows. The primary radioactive radiation of source 2 excites X-rays in target 3, which, in their turn, excite, upon falling on test specimen 5, the characteristic radiation of the sought element, the characteristic radiation being registered by detector 10. The characteristic radiation intensity depends upon the concentration of the sought element in test specimen 5. The beta radiation of emitter 6, upon reflection from the test specimen, is also registered by detector 10 coupled to the input of amplifying recorder unit 11. To discriminate the characteristic radiation of the sought element and the beta radiation reflected by the test specimen, test specimen 5 is irradiated alternately by the radiation from target 3 and by the beta-particle flux from emitter 6, the alternate irradiation being attained due to the reciprocation of movable shutter 8 with window 9, which coincides, while in position A (FIG. 1), with channel 4, and with channel 7, while in position B.

Data obtained from unit 11 renders it possible to determine the intensity of the characteristic radiation of the sought element in the test specimen and also to evaluate the effective atomic number of the specimen, thereby providing the possibility of allowing for the effect of the elemental composition of the test specimen on the intensity of characteristic radiation of the sought element, as the absorption characteristics of the test specimen are governed by the effective atomic number.

In the device according to the second embodiment of the present invention, window 9 coincides with channel 4 when movable shutter 8 is in position A, so that test specimen 5 is irradiated with the radiation emitted by target 3, while beta emitter 6 is housed within the lead shield of body 1. When in position B, movable shutter 8 closes channel 4 and absorbs completely the radiation from target 3, while beta emitter 6 emerges from inside the lead shield and irradiates test specimen 5.

In the device according to the third embodiment of the present invention, two portions of test specimen 5 are disposed in openings of rotating disk 13 and are subjected simultaneously to irradiation with X rays from target 3 and with a beta-particle flux from emitter 6. Simultaneous registering of the beta radiation reflected by the test specimen and of the characteristic radiation of the sought element is effected by detectors 10 and 14 coupled to the input of two-channel amplifying recorder unit 11.

Where test specimen 5 contains elements whose atomic number is close to that of the sought element, recourse may be had to Ross filters 12 for carrying out determinations in all device modifications.

The intensity of characteristic radiation of the sought element is measured by means of amplifying recorder unit 11 functioning as a differential single-channel analyzer, while the beta radiation scattered by the test specimen is measured by amplifying recorder unit 11 (or by an appropriate channel when use is made of the third embodiment of the present device) functioning as an integrator discriminator.

The employment of a graph, in which the scattered beta-particle flux is plotted versus the effective atomic number of the test specimen, makes it possible to introduce an unequivocal correction into the results of measuring the intensity of characteristic radiation of the sought element.

The present invention provides for determining the concentration of sought elements in test specimens on the basis of characteristic radiation of the elements, for evaluating the absorption characteristics of a test specimen from the effective atomic number of the specimen, and also for allowing for the effect of the elemental composition of the test specimen on the intensity of characteristic radiation of the sought element.

The device has been employed for determining the content of iron in ores and ore-dressing products from deposits of diverse types, and iron percentages obtained by means of the present device have been compared with data of accurate chemical analyses.

The mean-root-square statistical error for analyses of 1-minute duration is as follows for various iron percentage ranges:

| Range of iron concentration, percentage | Mean-root-square error, percent of iron |
| --- | --- |
| 0.5–20 | 0.06 |
| 20–40 | 0.10 |
| 40–70 | 0.13 |

The reproducibility of results for repeated determinations on test specimens containing about 55% Fe is characterized by a mean-root-square error 0.25% Fe.

The total time required for analyzing a single test specimen, sample preparation and data handling inclusive, amounts to 3–4 minutes.

We claim:

1. A device for the X-ray radiometric determination of elements in test specimens, which comprises the following components disposed in a body: an X-ray source including a radioactive source and a target irradiated by said radioactive source and emitting X-rays which excite characteristic radiation in a test specimen; a detector which registers said characteristic radiation from the sought element of a test specimen; an emitter of beta flux whose reflection by a test specimen makes it possible to evaluate the absorption characteristics of the test specimen and to allow for the effect of the elemental composition of said test specimen on the intensity of characteristic radiation of the sought element; an amplifying recorder unit for evaluating the intensity of said characteristic radiation in the desired spectral region and to measure the flux of beta particles reflected by said test specimen, said X-ray source and emitter of beta flux being disposed on the same side of the specimen as is the detector, the latter receiving secondary radiation emitted from said specimen produced by the irradiation by said X-ray source and said emitter of beta flux.

2. A device according to claim 1 wherein said beta flux emitter is disposed so that said test specimen is irradiated alternately by the radiation from said X-ray source and said emitter of beta flux.

3. A device according to claim 2 wherein said beta flux emitter is fixedly mounted in said body, the device further comprising means for alternate irradiation of said test specimen by the radiation from said X-ray source and by the emitter of beta flux including a movable shutter with a window, on one side of which shutter are disposed said emitter of beta flux and said X-ray source, and on the other side, said test specimen and detector.

4. A device according to claim 2 comprising means for the alternate irradiation of a test specimen by the radiation from said X-ray source and said emitter of beta flux including between said X-ray source and said specimen, a reciprocably movable shutter with a window, said emitter of beta flux disposed on said shutter such that the window and emitter of beta flux alternately face said specimen.

5. A device according to claim 1 wherein said emitter of beta flux is fixedly mounted in said body, means to simultaneously record in two channels the characteristic radiation and beta radiation reflected by said test specimen, said device further comprising a rotating disk having at least one pair of openings, said openings accommodating two portions of said test specimen, which are successively irradiated with X-rays and beta-particle flux, one portion being irradiated with X-rays from said X-ray source, while the other portion is irradiated with beta-particle flux from said emitter of beta flux.

References Cited

UNITED STATES PATENTS 3,121,166  2/1964  Vossberg.
3,177,360  4/1965  Hague et al. _____ 250—51.5

ARCHIE R. BORCHELT, Primary Examiner

S. C. SHEAR, Assistant Examiner